(12) United States Patent
Katsukura et al.

(10) Patent No.: US 10,867,581 B2
(45) Date of Patent: Dec. 15, 2020

(54) FACILITY EQUIPMENT MANAGEMENT APPARATUS

(71) Applicant: Mitsubishi Electric Corporation, Tokyo (JP)

(72) Inventors: Makoto Katsukura, Tokyo (JP); Tomoaki Gyota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/477,544

(22) PCT Filed: Mar. 23, 2017

(86) PCT No.: PCT/JP2017/011690
§ 371 (c)(1),
(2) Date: Jul. 12, 2019

(87) PCT Pub. No.: WO2018/173188
PCT Pub. Date: Sep. 27, 2018

(65) Prior Publication Data
US 2020/0020300 A1    Jan. 16, 2020

(51) Int. Cl.
*G09G 5/06* (2006.01)
*G06F 3/0484* (2013.01)

(52) U.S. Cl.
CPC .......... *G09G 5/06* (2013.01); *G06F 3/04847* (2013.01); *G09G 2320/066* (2013.01); *G09G 2320/0666* (2013.01); *G09G 2354/00* (2013.01)

(58) Field of Classification Search
CPC ............... G09G 5/06; G09G 2320/066; G09G 2320/0666; G09G 2354/00; G06F 3/04847
See application file for complete search history.

(56) References Cited

U.S. PATENT DOCUMENTS

2010/0274476 A1    10/2010    Kojima et al.
2013/0147630 A1    6/2013    Nakaya et al.
(Continued)

FOREIGN PATENT DOCUMENTS

EP    1117087 A2    7/2001
EP    2455934 A1    5/2012
(Continued)

OTHER PUBLICATIONS

Office Action dated Jan. 21, 2020 issued in corresponding JP patent application No. 2019-506824 (and English translation).
(Continued)

*Primary Examiner* — Chong Wu
(74) *Attorney, Agent, or Firm* — Posz Law Group, PLC

(57) ABSTRACT

A facility equipment management apparatus includes an image display unit, a display control unit that makes the image display unit display an image, an operation input unit that receives a user operation, a color palette database that stores a color palette that includes a plurality of pieces of display color data, a color palette construction unit that changes the plurality of pieces of display color data of the color palette based on color information designated on the operation input unit, and a component image database that stores component image data which indicates a display component; wherein the display control unit constructs color component image data, which is the component image data including display color data based on the component image data and the color palette, and makes the image display unit display the image by using the color component image data.

2 Claims, 11 Drawing Sheets

(56) References Cited

U.S. PATENT DOCUMENTS

2014/0184418 A1     7/2014   Maeda et al.
2016/0316214 A1*   10/2016   Gisquet .................. H04N 19/94

FOREIGN PATENT DOCUMENTS

| | | |
|---|---|---|
| JP | H02-128299 A | 5/1990 |
| JP | 2009-044683 A | 2/2009 |
| JP | 2010-154365 A | 7/2010 |
| JP | 2013-145548 A | 7/2013 |
| JP | 2014-126319 A | 7/2014 |
| JP | 2016-031616 A | 3/2016 |
| WO | 2009/066656 A1 | 5/2009 |
| WO | 2016/166826 A1 | 10/2016 |

OTHER PUBLICATIONS

International Search Report of the International Searching Authority dated Jun. 20, 2017 for the corresponding international application No. PCT/JP2017/011690 (and English translation).
Extended European Search Report dated Mar. 5, 2020 issued in corresponding EP patent application No. 17901624.1.

* cited by examiner

Pix0 = RGB(r0, g0, b0)
Pix128 = RGB(r128, g128, b128)

FIG. 10(a)

COLOR PALETTE

PRESENT

| COLOR NUMBER | DISPLAY COLOR: RGB VALUE (k = 0, 1, ···, 255) |
|---|---|
| 0 | RGB (r0, g0, b0) |
| 1 | RGB (r1, g1, b1) |
| ... | ... |
| k | RGB (rk, gk, bk) |
| ... | ... |
| 255 | RGB (r255, g255, b255) |

⇩ HSV CONVERSION

FIG. 10(b)

PRESENT

| COLOR NUMBER | DISPLAY COLOR: RGB VALUE (k = 0, 1, ···, 255) |
|---|---|
| 0 | HSV (h0, s0, v0) |
| 1 | HSV (h1, s1, v1) |
| ... | ... |
| k | HSV (hk, sk, vk) |
| ... | ... |
| 255 | HSV (h255, s255, v255) | hk = 0~360

FIG. 10(c)

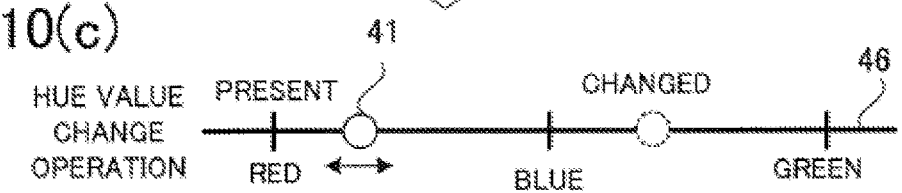

HUE VALUE CHANGE OPERATION — PRESENT 41, CHANGED 46, RED ↔ BLUE GREEN

FIG. 10(d)

CHANGED

| COLOR NUMBER | DISPLAY COLOR: RGB VALUE (k = 0, 1, ···, 255) |
|---|---|
| 0 | HSV (h0*, s0*, v0*) |
| 1 | HSV (h1*, s1*, v1*) |
| ... | ... |
| k | HSV (hk*, sk*, vk*) |
| ... | ... |
| 255 | HSV (h255*, s255*, v255*) | hk* = 0~360

⇩ RGB CONVERSION

FIG. 10(e)

CHANGED                                             COLOR PALETTE

| COLOR NUMBER | DISPLAY COLOR: RGB VALUE (k = 0, 1, ···, 255) |
|---|---|
| 0 | RGB (r0*, g0*, b0*) |
| 1 | RGB (r1*, g1*, b1*) |
| ... | ... |
| k | RGB (rk*, gk*, bk*) |
| ... | ... |
| 255 | RGB (r255*, g255*, b255*) |

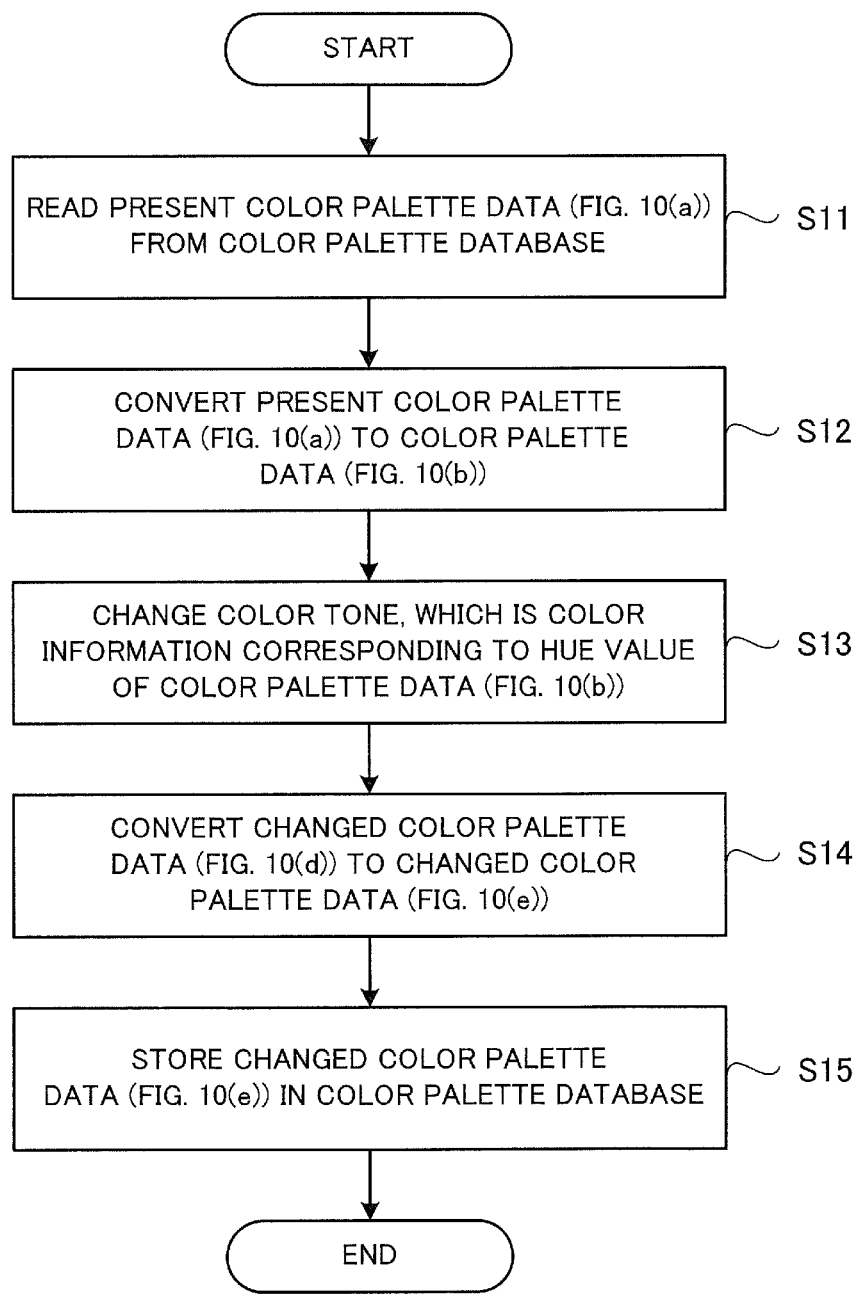

FACILITY EQUIPMENT MANAGEMENT APPARATUS

CROSS REFERENCE TO RELATED APPLICATION

This application is a U.S. national stage application of International Patent Application No. PCT/JP2017/011690 filed on Mar. 23, 2017, the disclosure of which is incorporated herein by reference.

TECHNICAL FIELD

The present invention relates to a facility equipment management apparatus for managing facility equipment, and specifically relates to a facility equipment management apparatus capable of setting the tint of a display image on an image display unit by a user operation.

BACKGROUND ART

In recent years, in relation to a facility equipment management apparatus (a controller for an air conditioner, for example) set on a wall of a building, there has been a demand for including the facility equipment management apparatus with a function to change the color of a screen of an image display unit and thus making the color of the screen be a color in the same range as the color of the wall.

Patent Reference 1 suggests an air conditioner controller equipped with light emitting diodes (LED) of three colors to illuminate a screen of an image display unit.

Patent Reference 2 suggests a control apparatus that includes a warm-color operation button and a cold-color operation button, adjusts color arrangement of the operation buttons, and thus makes a user feel a desired environment through visual perception.

PATENT REFERENCE

Patent Reference 1: Japanese Patent Application Publication No. 2014-126319 (paragraph 0012, for example)

Patent Reference 2: Japanese Patent Application Publication No. 2016-031616 (paragraph 0069, for example)

However, the apparatus of Patent Reference 1 does not have a function to change the color per se of the screen of the image display unit.

The apparatus of patent literature 2 is capable of adjusting the colors of the operation buttons but takes no measures for appropriately setting a contrast between the screen background color and the text color. Therefore, it is difficult for the elderly, the visually-handicapped or the like to recognize characters.

SUMMARY

The present invention has been made to solve the problems described above and has an object of providing a facility equipment management apparatus capable of changing a display image on an image display unit to have a desired tint while maintaining an appropriate contrast, by a user operation.

A facility equipment management apparatus according to the present invention is an apparatus that performs communication with a facility equipment and manages an operation of the facility equipment; the facility equipment management apparatus includes an image display unit, a display control unit that makes the image display unit display an image, an operation input unit that receives a user operation, a color palette database that stores a color palette that includes a plurality of pieces of display color data, a color palette construction unit that changes the plurality of pieces of display color data of the color palette based on color information designated on the operation input unit, and a component image database that stores component image data which indicates a display component, wherein the display control unit constructs color component image data, which is the component image data including display color data based on the component image data and the color palette, and makes the image display unit display the image by using the color component image data.

According to the present invention, an effect of changing a display image of an image display unit of a facility equipment management apparatus to a desired tint while maintaining an appropriate contrast can be obtained.

BRIEF DESCRIPTION OF THE DRAWINGS

FIGS. 10(*a*) to 10(*e*) are diagrams showing a color palette generation operation by a color palette construction unit in the first embodiment.

FIG. 11 is a flowchart showing the color palette generation operation by the color palette construction unit in the first embodiment.

DETAILED DESCRIPTION

Facility equipment management apparatuses of embodiments of the present invention will be described below with reference to attached drawings. The following embodiments are merely examples, and a variety of modifications are possible within the scope of the present invention.

(1) First Embodiment (1-1) Configuration

Figure 1:
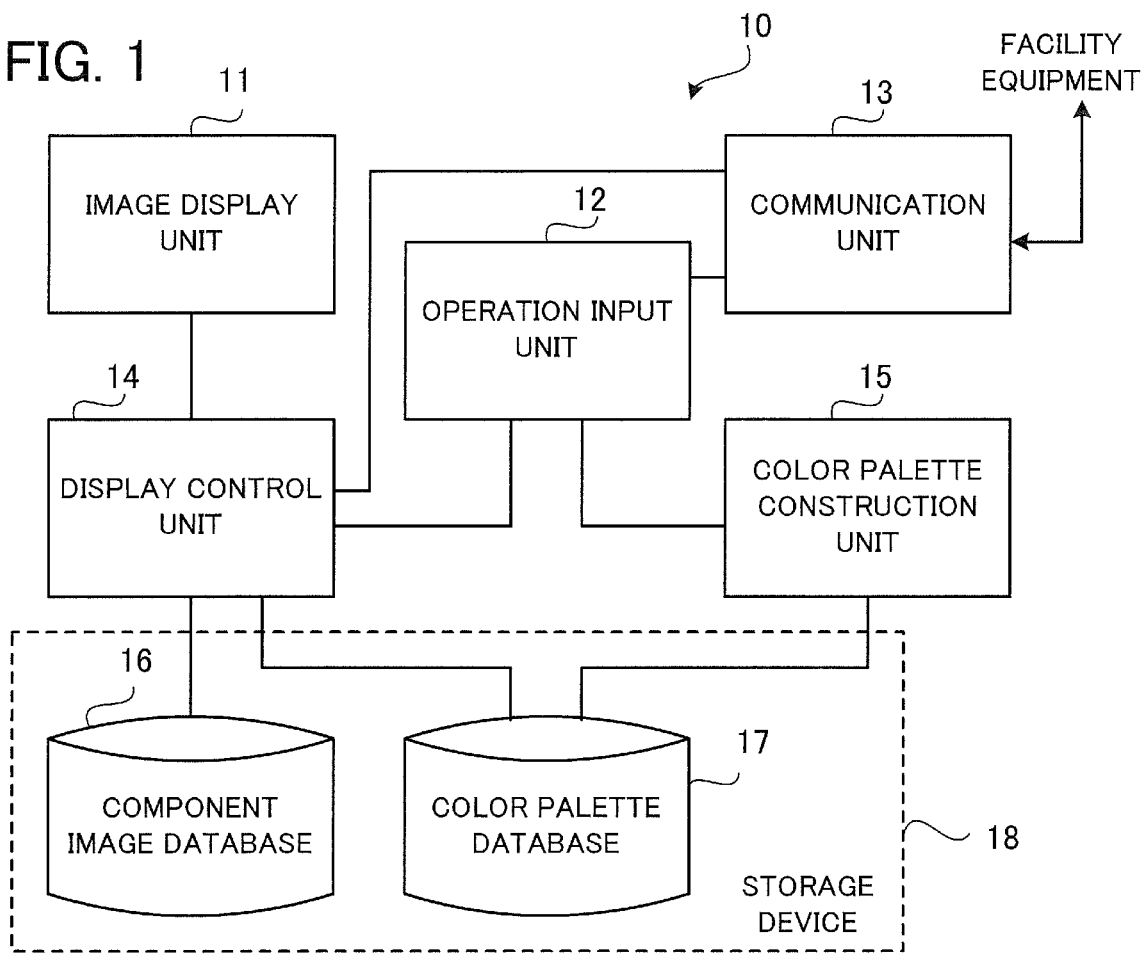
FIG. 1 is a functional block diagram schematically showing a configuration of a facility equipment management apparatus according to a first embodiment of the present invention.

FIG. 1 is a functional block diagram showing a schematic configuration of a facility equipment management apparatus 10 according to a first embodiment. The facility equipment management apparatus 10 is, for example, a remote control apparatus that is set on a wall of a building or the like and manages (controls) the operation and the state of an air conditioner as facility equipment.

As shown in FIG. 1, the facility equipment management apparatus 10 includes an image display unit 11 that displays an image, an operation input unit 12 that receives a user operation, a communication unit 13 that performs communication with an external device, a component image database 16 that stores component image data, which are data of display components such as a numeral, a character, and a symbol, and a color palette database 17 that stores a color palette that includes a plurality of pieces of display color data (color palette data). The facility equipment management apparatus 10 also includes a color palette construction unit 15 that changes the color palette stored in the color palette database 17 based on color information (information corresponding to a hue value) designated by a user operation and a display control unit 14 that performs processing for making the image display unit 11 display an image.

The display control unit 14 has a function of a color component image data construction unit that constructs color component image data, which is component image data including display color data based on component image data read from the component image database 16 and a color palette read from the color palette database 17. The display control unit 14 also has a function to generate display image data by using input display data and color component image data and to supply them to the image display unit 11.

The component image database 16 and the color palette database 17 are stored in a storage device 18 such as a semiconductor memory. The storage device 18 is, for example, a flash memory. The component image database 16 and the color palette database 17 can be stored in storage devices differing from each other.

Figure 2:
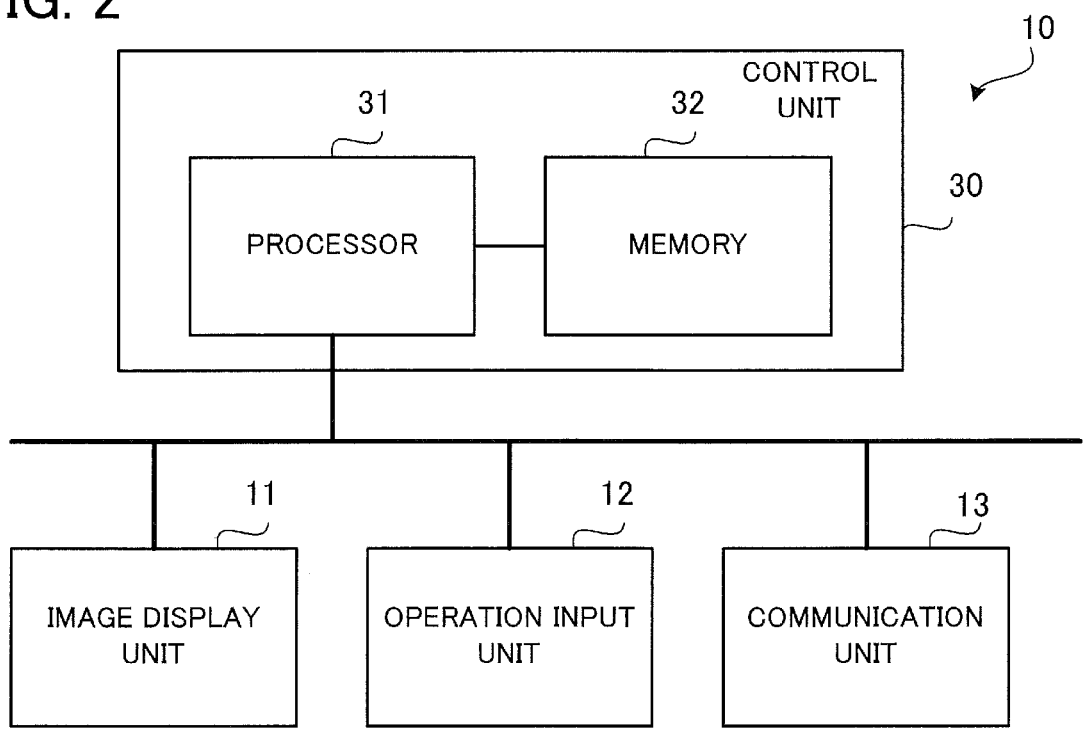
FIG. 2 is a diagram showing an example of a hardware configuration of the facility equipment management apparatus according to the first embodiment.

FIG. 2 is a diagram showing an example of a hardware (H/W) configuration of the facility equipment management apparatus 10. The facility equipment management apparatus 10 includes a memory 32 that stores a program as a software and a processor (CPU: central processing unit) 31 that is an information processing unit that executes the program stored in the memory 32. The processor 31 and the memory 32 configure a control unit 30 that controls the operation of the facility equipment management apparatus 10. By executing a program, the processor 31 can implement the display control unit 14 and the color palette construction unit 15 shown in FIG. 1.

Figure 3:
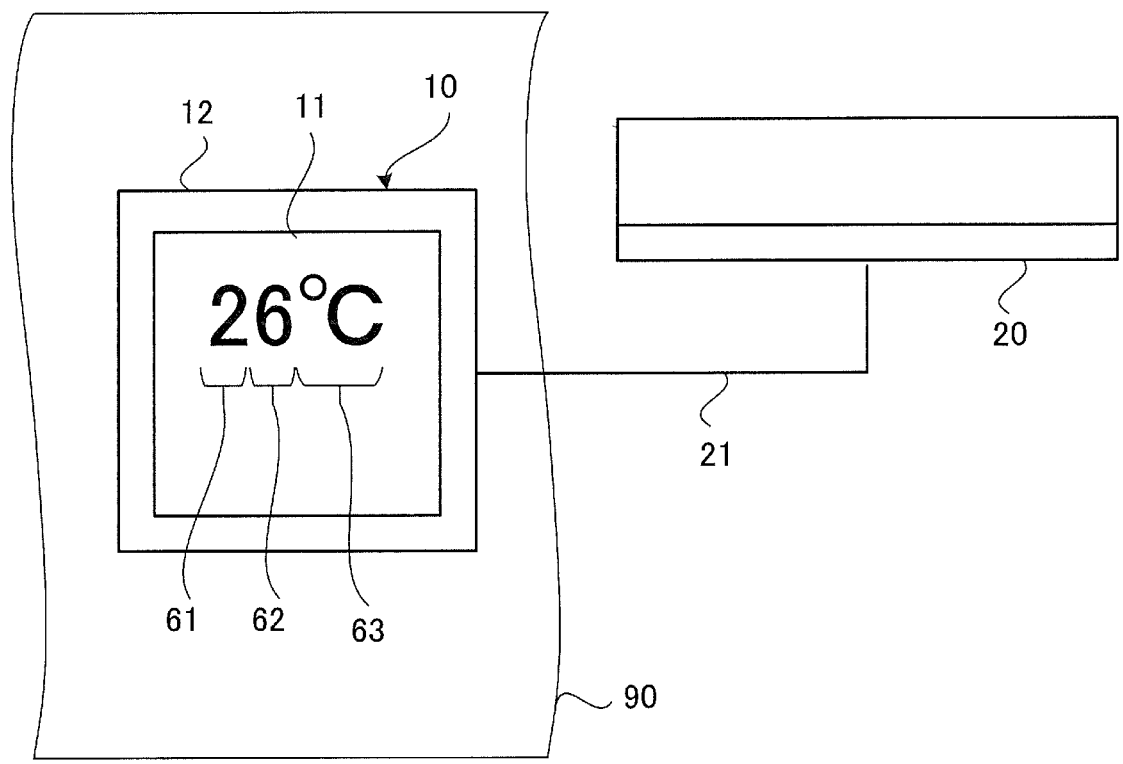
FIG. 3 is an appearance diagram schematically showing the facility equipment management apparatus according to the first embodiment.

FIG. 3 is an appearance diagram schematically showing the facility equipment management apparatus 10. As shown in FIG. 3, the facility equipment management apparatus 10 is set in a position visible to the user on a wall surface 90 by securing means such as screws. The facility equipment management apparatus 10 includes the image display unit 11 such as a liquid crystal display and the operation input unit 12 as a user operation unit. The image display unit 11 and the operation input unit 12 can be a touch panel including an image display panel that displays an image and an operation panel that receives a user operation. The image display unit 11 is placed in such a manner that the user can see it, and the operation input unit 12 is placed in such a manner that the user can operate it. The facility equipment management apparatus 10 is connected through a communication line 21 to the air conditioner 20 as equipment to be managed. For example, the user can recognize a set temperature of the air conditioner 20 by looking at the screen of the image display unit 11 of the facility equipment management apparatus 10. The user can also change an operation state and the set temperature of the air conditioner 20 by operating the operation input unit 12 of the facility equipment management apparatus 10.

The configuration of the facility equipment management apparatus 10 will next be described more specifically.

The image display unit 11 is, for example, a liquid crystal display utilizing color Thin Film Transistor (TFT) liquid crystal. The display control unit 14 can make the image display unit 11 display a present set temperature of the air conditioner, which is the facility equipment. The display control unit 14 can make the image display unit 11 display an image by using display components. The display components include numerals from 0 to 9 and unit symbols "° C.", which denotes Celsius, and "° F.", which denotes Fahrenheit. The image display unit 11 can display a color image. The display control unit 14 can make the image display unit 11 display a color information setting screen through which the user inputs a desired tint. The tint input through the color information setting screen is information on a color desired by the user and, for example, information indicating a hue. Generally, the facility equipment management apparatus 10 has prescribed a size (as 12 cm×12 cm or 12 cm×6 cm, for example) conforming to a standard, and the size of the screen of the image display unit 11 is smaller than a size of the apparatus.

The operation input unit 12 can be implemented by a resistive touch panel, for example. The operation input unit 12 and the image display unit 11 are superposed, and the operation input unit 12 and the image display unit 11 form a touch panel that detects a touch input operation performed by the user with a finger. The operation input unit 12 detects a pressure received from the user's finger and acquires information corresponding to a position where the user touches as input content. When the user presses an operation button (operation means) as a display component displayed in a particular position of the image display unit 11, the operation input unit 12 performs processing for the request such as "OK", "Cancel", "Forward", "Backward", "Increase", "Decrease" etc. The operation input unit 12 also receives, through the color information setting screen, input instructions on the tint that the user desires made on the image display unit 11.

The communication unit 13 includes communication ICs (integrated circuits), for example. The communication unit 13 performs communication with the air conditioner 20, which is the facility equipment to be managed. Generally, the air conditioner 20 includes an outdoor unit equipped with a compressor, a heat exchanger, a fan, and an electric motor, an indoor unit equipped with a heat exchanger, a fan, an electric motor, and a control circuit, and a refrigerant pipe for circulating a refrigerant between the outdoor unit and the indoor unit. The air conditioner 20 stores the set temperature information as a target temperature of the operation. The facility equipment management apparatus 10 can acquire the set temperature of the air conditioner 20 through the communication unit 13. It can also change the operation state and set temperature of the air conditioner 20 by sending a command from the communication unit 13.

Figure 4:
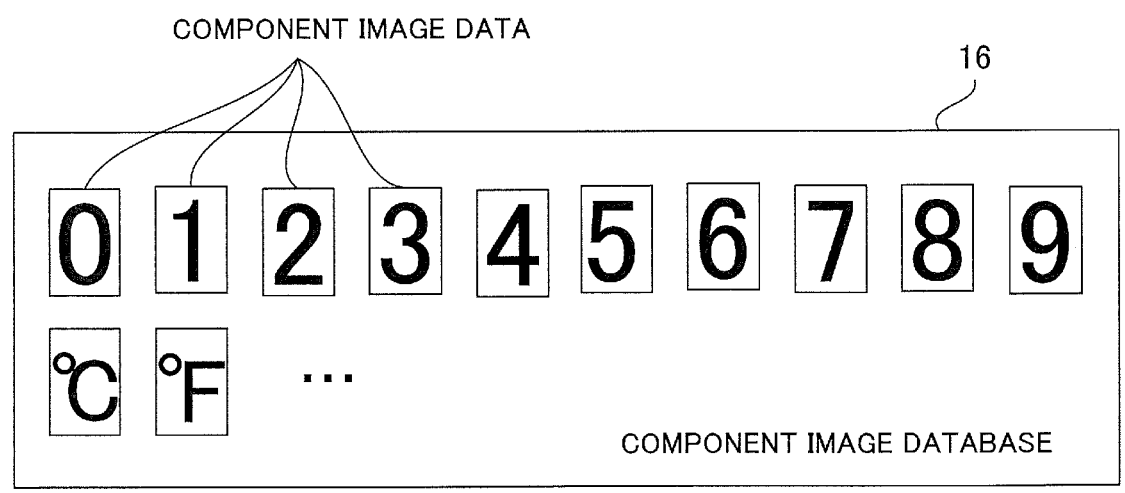
FIG. 4 is a diagram showing an example of a component image database in the first embodiment.
Figure 5:
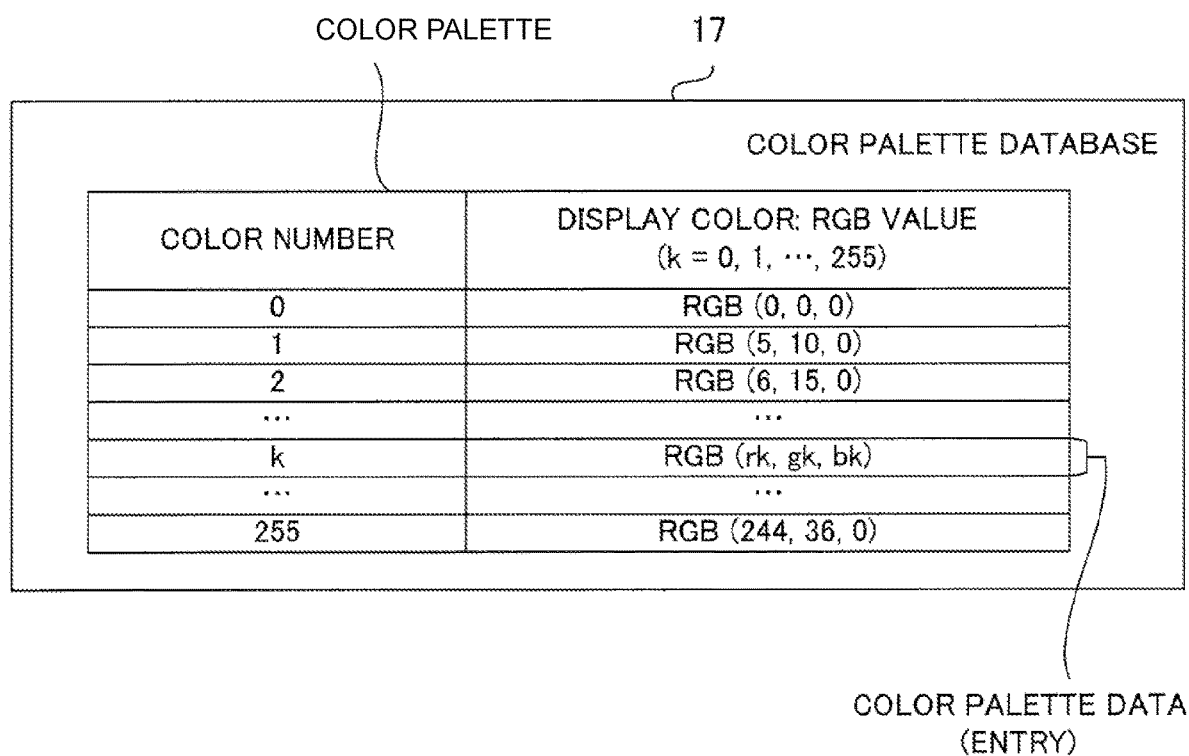
FIG. 5 is a diagram showing an example of a color palette database in the first embodiment.
Figure 6:
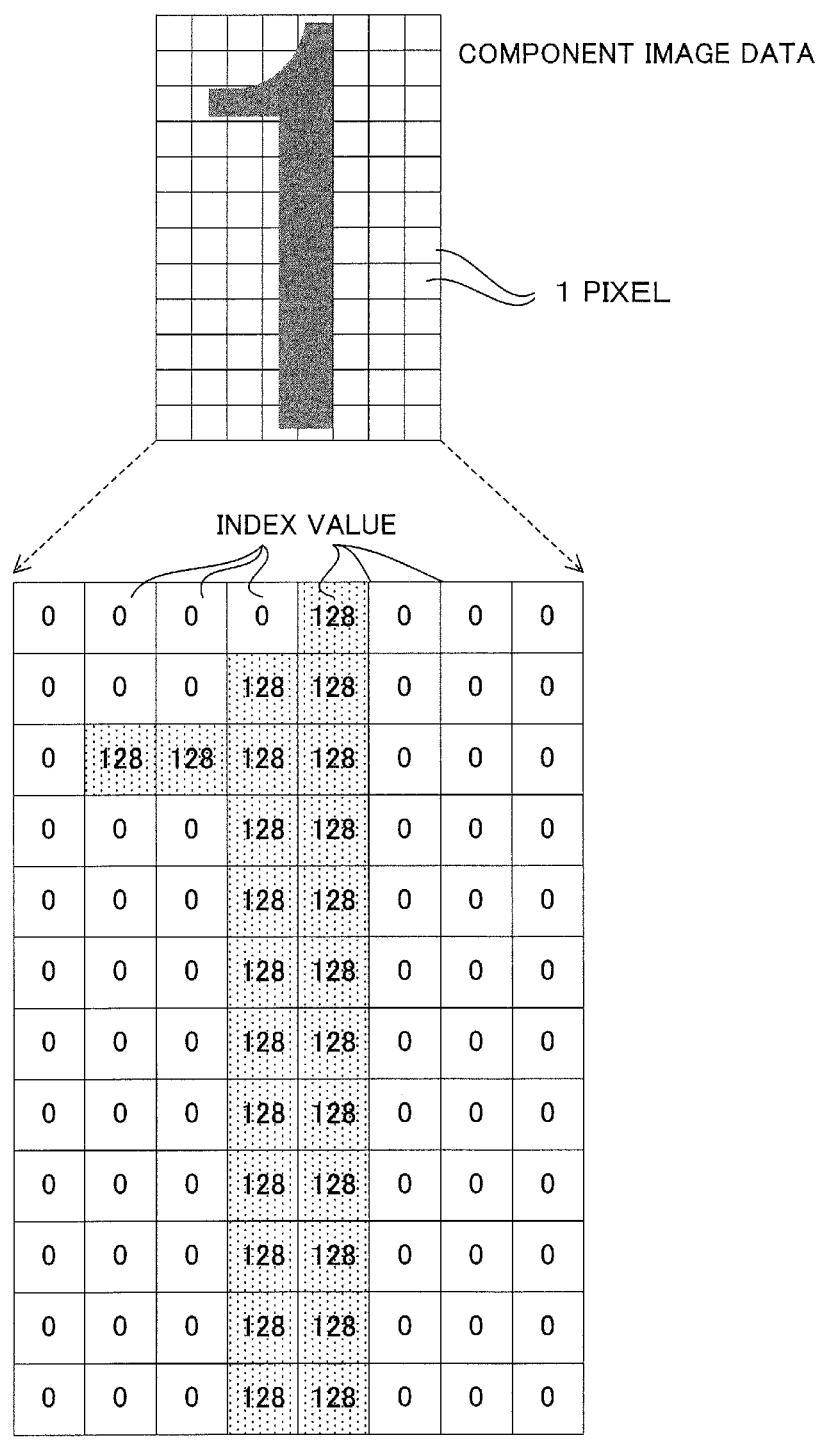
FIG. 6 is a diagram showing an example of component image data (index values) of the component image database shown in FIG. 4.
Figure 7:
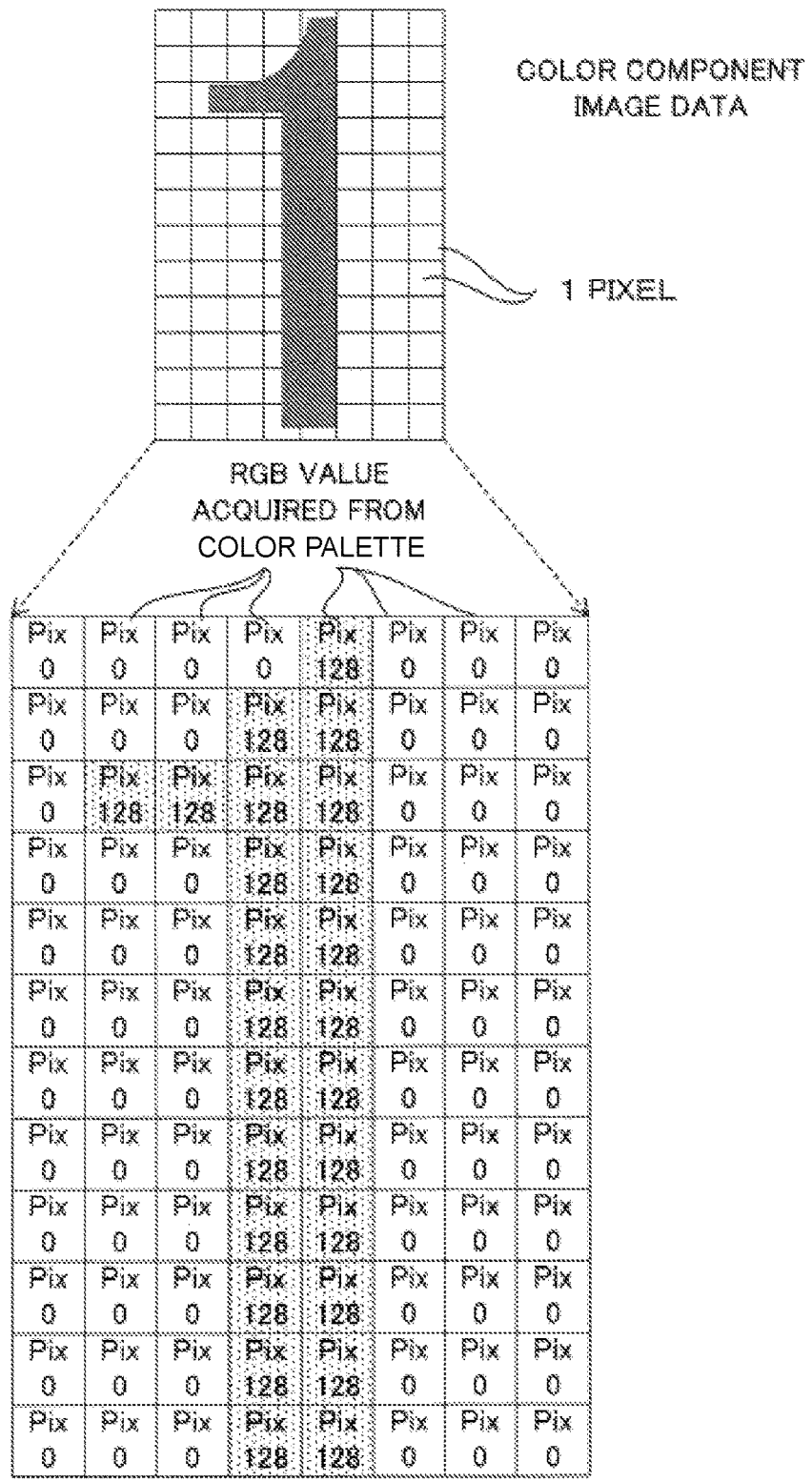
FIG. 7 is a diagram showing an example of color component image data (RGB values) generated based on the component image data (index values) in FIG. 6 and the color palette (RGB values) in FIG. 5.

The display control unit 14 constructs color component image data that are used to make the image display unit 11 display an image. The image displayed by the image display unit 11 is formed by combining color component images based on color component image data. For example, the component image database 16 stores component image data of numerals 0, 1 to 9, symbols representing units, and the like. The display control unit 14 displays the color component image (as indicated by reference characters 61 to 63 in FIG. 3) in a prescribed coordinate position on the screen by using color component image data (as shown in FIG. 7, which will be described later) constructed by component image data (as shown in FIGS. 4 and 6, which will be described later) and a color palette (as shown in FIGS. 5 and 10(e), which will be described later) converted to a user-designated tint. In that way, the image display unit 11 displays the present set temperature (a combination of numeral from 0 to 99 and a unit, for example) to the user.

The color palette construction unit 15 constructs a color palette for implementing a tint desired by the user and stores it as a color palette database 17 in the storage device 18. After reading an existing color palette (as shown in FIG. 10(a), which will be described later), the color palette construction unit 15 converts it to HSV values (as shown in FIG. 10(b), which will be described later), changes the HSV values (that is, performs color tone change processing) (as shown in FIG. 10(d), which will be described later) in accordance with the tint (as shown in FIG. 10(c), which will be described later) input by the user operation, and generates a new color palette (as shown in FIG. 10(e), which will be described later) by using the changed HSV values.

In the component image database 16, the component image data are saved. FIG. 4 is a drawing showing an example of the component image database 16 in the first embodiment. The component image data include, for example, the image data of numerals from 0 to 9 and the image data of symbols representing Celsius and Fahrenheit.

In the color palette database 17, the color palette generated by the color palette construction unit 15 is stored. The color palette data included in the color palette database 17 are used by the display control unit 14.

FIG. 5 is a conceptual diagram showing a configuration of a color palette stored in the color palette database 17 in the first embodiment.

The color palette includes a plurality of entries (256 pieces in FIG. 5) (that is, color palette data), and each of the plurality of entries includes a color number (0 to 255 in FIG. 5) and an RGB value that is display color data, i.e., red (R), green (G) and blue (B) values. In the example shown in FIG. 5, the color number is a numerical value from 0 to 255, and the color number is used to designate the color of a pixel of display component data. The number of color numbers is not limited to 256 and can be any other number.

The display color data corresponding to the color number are 24-bit full-color data that indicate the color used when the pixel constituting the color component image displayed in the image display unit 11 is displayed. The 24-bit full-color data are data combining 8-bit R-color data, 8-bit G-color data, and 8-bit B-color data.

In FIG. 5, the first entry in the color palette of a table structure is the entry of color number 0 and indicates the background color of the color component image. In FIG. 5, the entry of color number 1 and subsequent entries indicate the color of the numeral or character of the color component image, the color of shade, the color of the border, and the like and can be decided arbitrarily when the color component image is structured. FIG. 5 shows a color palette being data of a tint in a red range (including colors in a green range), and the tint of the color palette is changed by a user operation.

FIG. 6 is a diagram showing an example of component image data (index values) of the component image database 16 shown in FIG. 4. FIG. 7 is a diagram showing an example of color component image data (RGB values) generated based on the component image data (index values) in FIG. 6 and the color palette in FIG. 5.

The color (RGB value, that is, Pix0 to Pix255 in FIG. 7) of the color component image shown in FIG. 7 is determined by combining the index value (corresponding to the color number) indicated as each pixel of the component image shown in FIG. 6 and the entry of the display color corresponding to the color number included in the color palette shown in FIG. 5. For example, index value 0 of a pixel in the component image data shown in FIG. 6 is replaced by RGB (0, 0, 0) that is the display color data corresponding to color number 0 in the color palette shown in FIG. 5, and index value k (k=0, 1, . . . , 255) of a pixel in the component image data shown in FIG. 6 is replaced by RGB (rk, gk, bk) that is the display color data corresponding to color number k in the color palette shown in FIG. 5. That is, if the display color data of the color palette are in the red range, the color component image data becomes the data of the red range; if the display color data of the color palette are in the blue range, the color component image data becomes the data of the blue range; and if the display color data of the color palette are in the green range, the color component image data becomes the data of the green range.

In summary, the component image data (index value) do not include the display color data as shown in FIG. 6, but the component image data in FIG. 6 is combined with the display color data obtained from the color palette in FIG. 5 and therefore the component image data including display color data as shown in FIG. 7, that is, color component image data (RGB value) is obtained.

Figure 8:
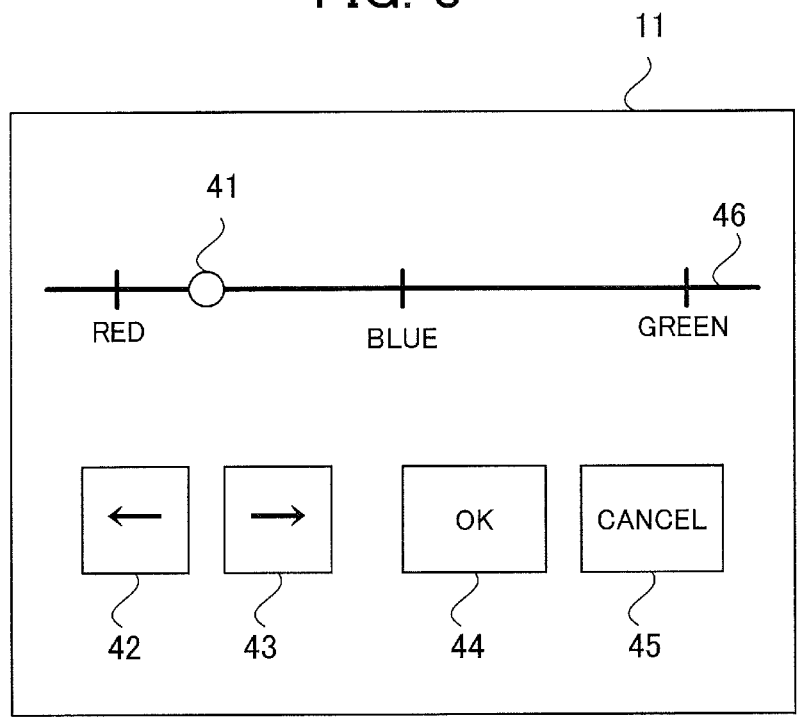
FIG. 8 is a schematic diagram showing a color information setting screen of the image display unit of the facility equipment management apparatus according to the first embodiment.

FIG. 8 is a schematic drawing showing a color information setting screen of the image display unit 11 of the facility equipment management apparatus 10 in the first embodiment. The color information setting screen in FIG. 8 includes an indicator 41, which indicates the color tone corresponding to a present hue value, a Left Move button 42, a Right Move button 43, an OK button 44, a Cancel button 45, and an indicator guide 46, which indicates a settable range of the color tone. The indicator guide 46 indicates a guidable range corresponding to a changeable range of the hue value; the indicator 41 can move in a direction of length within the guide range; and a hue value can be specified by a position of the indicator 41 within the guide range.

The indicator 41 and the indicator guide 46 are provided to help the user to intuitively know the color tone corresponding to the present hue value. The indicator 41 is displayed on the indicator guide 46 and displayed in the position corresponding to the present color tone.

The Left Move button 42 is an operation button for moving the indicator 41 leftward on the indicator guide 46. The Right Move button 43 is an operation button for moving the indicator 41 rightward on the indicator guide 46. The hue value after the indicator is moved is a temporary hue value and is not a determined value until the OK button 44 is pressed.

The OK button 44 is an operation button for setting the temporary hue value described above and making it the present hue value. The Cancel button 45 is an operation button for canceling the temporary hue value described above.

On the indicator guide 46, characters such as Red, Blue, and Green indicate the color ranges of the image displayed on the image display unit 11. Accordingly, the user can change (set) the tint of the image displayed on the image display unit 11 according to a relative position of the indicator 41 rather than by inputting a numerical value indicating the hue value.

(1-2) Operation

Figure 9:
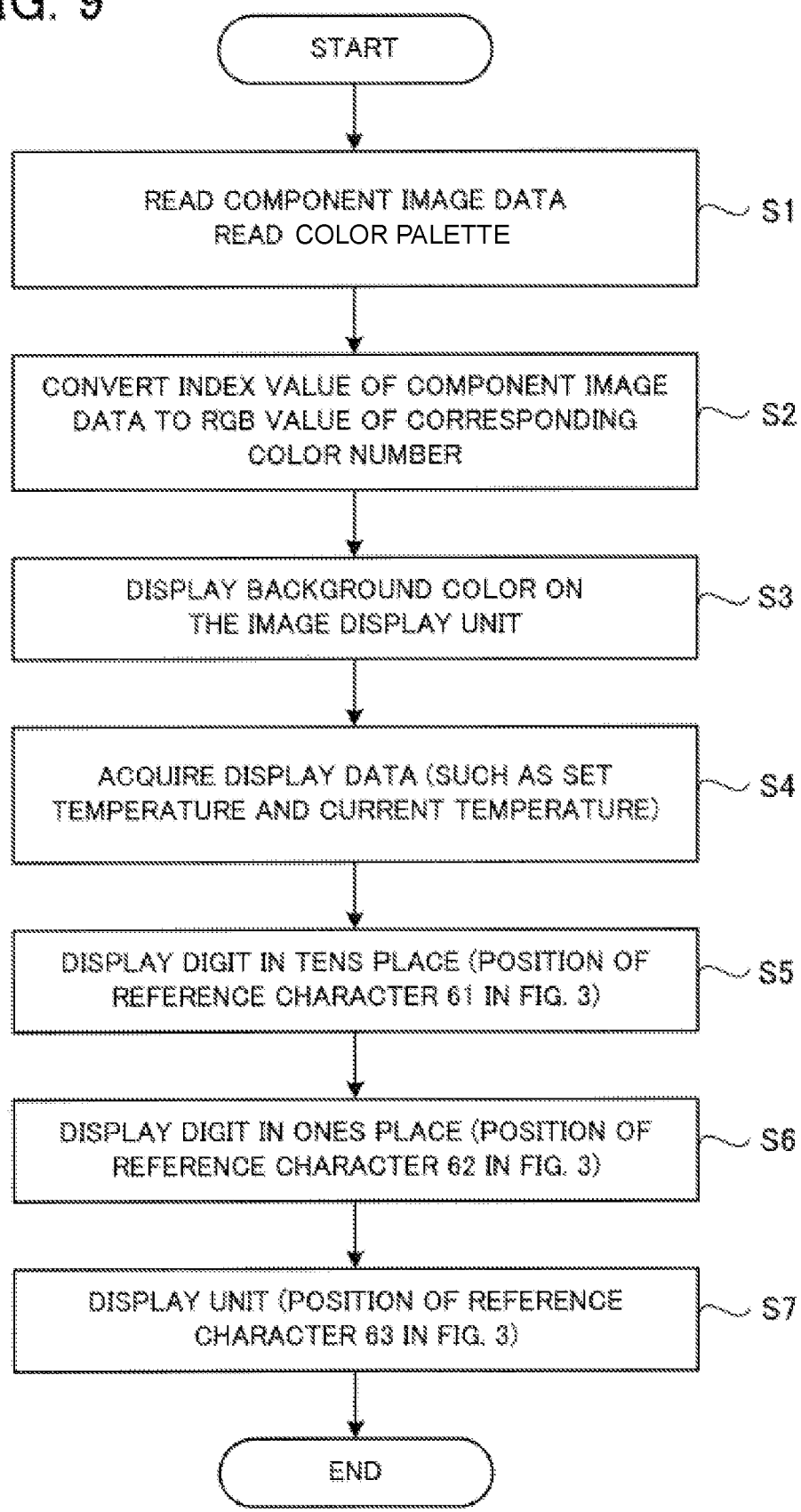
FIG. 9 is a flowchart showing a display image generation operation by a display control unit in the first embodiment.

FIG. 9 shows an operation from when the display control unit 14 constructs the color component screen data until when an image (e.g., a set temperature) is displayed on the image display unit 11 by using the constructed color component image data in the first embodiment.

In step S1, the display control unit 14 reads component image data from the component image database 16, reads a color palette from the color palette database 17, and saves them in a temporary memory. The temporary memory can be a memory (not shown) in the display control unit 14 or another memory such as the storage device 18 shown in FIG. 1.

In next step S2, the display control unit 14 reads display color data of the color numbers corresponding to the index values concerning pixels of the read component image data from the color palette and saves display image data obtained by replacing the index values to the display color data of its corresponding color numbers, that is, color component image data, in the temporary memory.

In next step S3, the display control unit 14 reads a display color of the entry of color number 0 (first entry) from read color palette, paints the whole surface of the image display unit 11 with the display color of the entry of color number 0, and thus the background color is set.

In next step S4, the display control unit 14 requests the communication unit 13 to acquire the present set temperature of the air conditioner 20. The communication unit 13 communicates with the air conditioner 20, acquires the present set temperature, and passes it to the display control unit 14. On this occasion, the communication unit 13 also passes information indicating whether the unit of the set temperature is Celsius or Fahrenheit.

In next step S5, the display control unit 14 displays the digit in the tens place (position denoted by reference character 61 in FIG. 3) of the set temperature. For example, if the digit in the tens place is 2, data corresponding to numeral "2" is read from the color component image data obtained by the conversion in step S2 and written in a specific coordinate of the image display unit 11.

In next step S6, the display control unit 14 displays the digit in the ones place (position denoted by reference character 62 in FIG. 3) of the set temperature. For example, if the digit in the ones place is 6, data corresponding to numeral "6" is read from the color component image data obtained by the conversion in step S2 and written in a specific coordinate of the image display unit 11. In this occasion, the digit in the ones place and the digit in the tens place displayed in step S5 do not overlap with each other.

In next step S7, the display control unit 14 displays the unit symbol (position denoted by reference character 63 in FIG. 3) of the set temperature. For example, if the unit is Celsius, data of "° C." is read from the image data obtained by the conversion in step S2 and written in a specific coordinate of the image display unit 11. On this occasion, the image data and the digit in the ones place displayed in step S6 do not overlap with each other.

Next, the construction (generation) of a new color palette on the basis of a user-designated color tone (color information indicating a hue value and the position of the indicator 41 in the first embodiment) will be described. This construction of color palette is performed prior to the processing of step S1 in FIG. 9.

FIGS. 10(*a*) to 10(*e*) are diagrams showing an operation of generating the color palette by the color palette construction unit 15 in the first embodiment. FIG. 11 is a flowchart showing the operation of generating the color palette by the color palette construction unit 15 in the first embodiment.

In step S11, the color palette construction unit 15 reads a present color palette from the color palette database 17 (FIG. 10(*a*)), and in next step S12, performs HSV conversion in relation to the display colors corresponding to the color numbers to convert all the colors to HSV values (FIG. 10(*b*)).

In next step S13, the color palette construction unit 15 changes the HSV value of each color number obtained by the HSV conversion in step S12 on a basis of the user-designated color information (the position of the indicator 41 being the color information corresponding to a hue value) (FIGS. 10(*c*) and 10(*d*)). Specifically, a new HSV value is calculated by changing the hue value by means of the position of the indicator 41 and not by changing the lightness and chroma besides.

In next step S14, the color palette construction unit 15 performs RGB conversion, thereby converting the HSV values obtained in step S13 to RGB values (FIG. 10(*e*)).

In next step S15, the color palette construction unit 15 writes all the converted RGB values into the color palette database 17.

Referring to the new color palette, the display control unit 14 constructs color component image data, and displays an image on the image display unit 11 by using the constructed color component image data. Therefore, the image is displayed with the tint according to the color tone designated (designated color information) by the user with the indicator 41.

(1-3) Effect

As described above, in the facility equipment management apparatus 10 according to the first embodiment, for the image display unit 11 that can display color images, the color palette construction unit 15 changes the display color data of a color palette in accordance with the color tone (color information corresponding to hue values) designated on the color information setting screen by the user, and the display control unit 14 generates a display image using color component image data generated by combining component image data and color palette data. Accordingly, the size of image data stored in the apparatus is very small and thus the user can make the facility equipment management apparatus 10 display an image with a desired voluntary tint by a simple operation. For example, the facility equipment management apparatus 10 can provide a display screen that matches the room interior by making the color of the image displayed on the image display unit 11 be a color in the same range as the color of the wall surface 90.

Moreover, as described above, the color information setting screen displays the indicator 41 indicating the present color value (hue value) and the indicator guide 46 indicating the position in the whole color range, and the user can easily change the tint of the display screen to a color in a desired color range by moving the indicator 41.

(2) Second Embodiment

Described in the first embodiment above is an example of displaying the indicator 41 and the indicator guide 46 on the color information setting screen displayed by the image display unit 11 and changing the tint of the screen by the user moving the indicator 41 on the indicator guide 46.

A facility equipment management apparatus according to a second embodiment differs from that of the first embodiment in that a hue value that is an HSV value is designated on the color information setting screen as a numerical value. Except for this point, the second embodiment is the same as the first embodiment. For this reason, the second embodiment will be described with reference to FIGS. 1 to 5 also.

Figure 12:
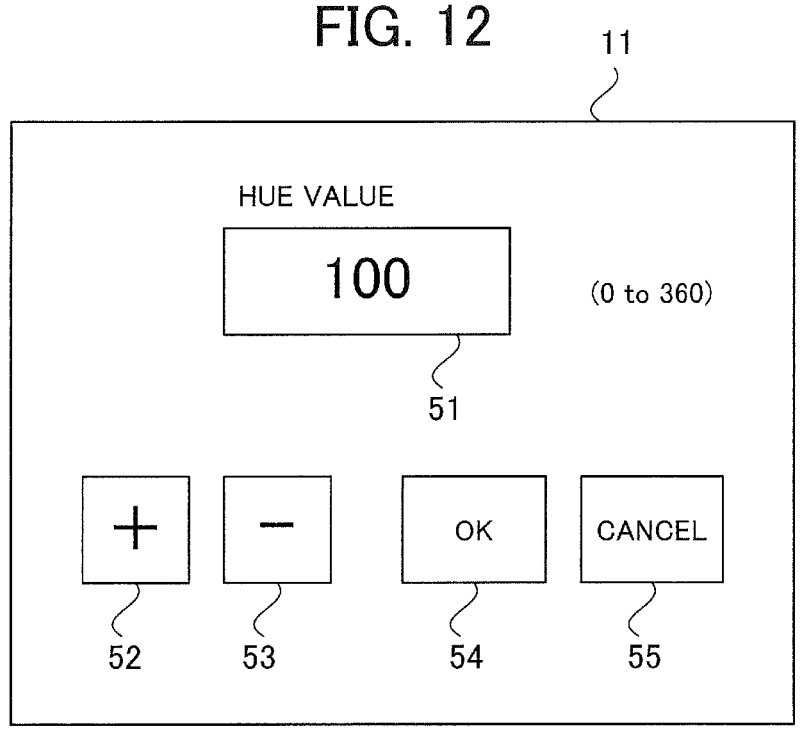
FIG. 12 is a schematic diagram showing a color information setting screen of an image display unit of a facility equipment management apparatus according to a second embodiment of the present invention.

FIG. 12 is a schematic diagram showing a color information setting screen of an image display unit 11 of the facility equipment management apparatus according to the second embodiment. The color information setting screen includes a hue value display box 51 which displays a hue value, an Add button 52, a Subtract button 53, an OK button 54, and a Cancel button 55 that are operation means.

The hue value display box 51 displays the present hue value. The present hue value is displayed as an integer value (a hue of HSV value) from 0 to 360, for example.

The Add button 52 is an operation button for increasing the hue value (adding 1). If the Add button 52 is pressed when the hue value is 360, the hue value changes to 0. The hue value after the addition with the Add button 52 is a temporary hue value and is not a determined value until the OK button 54 is pressed.

The Subtract button 53 is an operation button for decreasing the hue value (subtracting 1). If the Subtract button 53 is pressed when the hue value is 0, the hue value changes to 360. The hue value after the subtraction with the Subtract button 53 is a temporary hue value and is not a determined value until the OK button 54 is pressed.

The OK button 54 is an operation button for setting the temporary hue value described above as the present hue value. The Cancel button 55 is an operation button for canceling the temporary hue value described above.

As described above, the facility equipment management apparatus according to the second embodiment displays the hue value as a numerical value and sets the hue value as the numerical value by means of addition or subtraction, so that the installer or other contractors who initialize the facility equipment can input a designated value accurately.

(3) Third Embodiment

Described in the first and second embodiments above is the configuration that the user sets a desired color tone through the color information setting screen displayed on the image display unit 11 by means of the position of the indicator 41 or a numerical value indicating the hue value.

A facility equipment management apparatus according to a third embodiment differs from those in the first and second embodiments in that a hue difference value indicating the difference between hue values is designated as a numerical value on the color information setting screen. Except for this point, the third embodiment is the same as the first and second embodiments. For this reason, the third embodiment will be described with reference to FIGS. 1 to 5 also.

Figure 13:
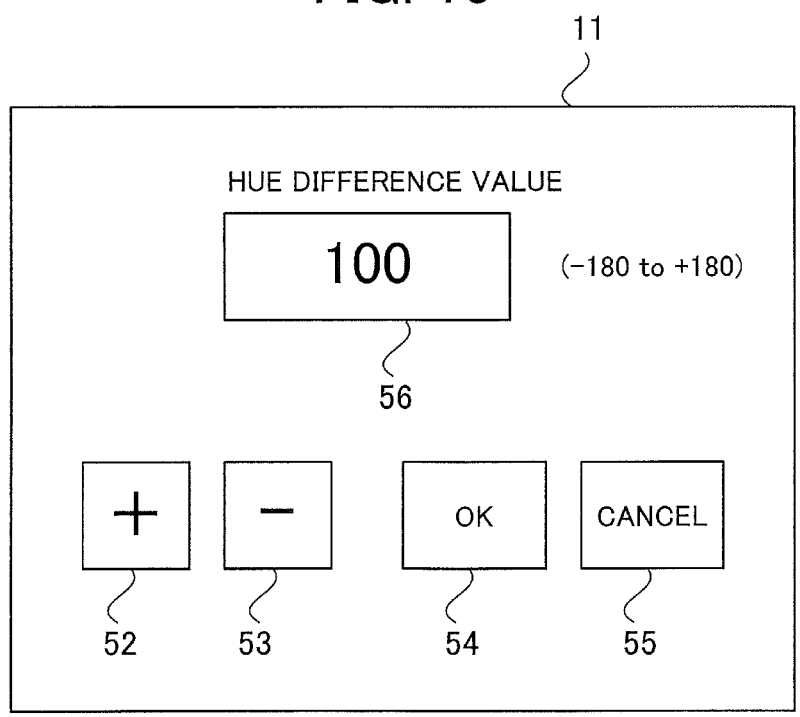
FIG. 13 is a schematic diagram showing a color information setting screen of an image display unit of a facility equipment management apparatus according to a third embodiment of the present invention.

FIG. 13 is a schematic diagram showing a color information setting screen of an image display unit 11 of the facility equipment management apparatus according to the third embodiment. The color information setting screen includes a hue difference value display box 56 that displays a hue difference value indicating a difference from the present hue value, an Add button 52, a Subtract button 53, an OK button 54, and a Cancel button 55.

The hue difference value display box 56 is provided to display an amount of change from the present hue value. The hue difference value is displayed is an integer value in a range of +180 to −180.

The Add button 52 is an operation button for increasing the hue difference value (adding 1). If the Add button 52 is pressed when the hue difference value is +180, the hue difference value changes to −180. The hue value after the addition with the Add button 52 is a temporary hue value and is not a determined value until the OK button 54 is pressed.

The Subtract button 53 is an operation button for decreasing the hue difference value (subtracting 1). If the Subtract button 53 is pressed when the hue difference value is −180, the hue difference value changes to +180. The hue value after the subtraction with the Subtract button 53 is a temporary hue value and is not a determined value until the OK button 54 is pressed.

The OK button 54 is an operation button for changing the hue value based on the hue difference value and setting it as the present hue value. The new hue value is calculated as the following expression:

(New hue value)=(Present hue value)+(Hue difference value)

The Cancel button 35 is an operation button for canceling the hue difference value described above.

As described above, the facility equipment management apparatus according to the third embodiment displays a value of difference from the present hue value as a numerical value and sets the hue difference value as a numerical value by means of addition or subtraction, so that the user can easily change the tint of the display screen when adjusting the color during the operation.

(4) Fourth Embodiment

Described in the first to third embodiments above is the configuration that the user sets a desired color tone through the color information setting screen displayed on the image display unit 11 by means of the position of the indicator 41, the hue value, or the hue difference value. That is, in the first to third embodiments described above, the user who can change the color information on the color information setting screen is limited to a person who has some expertise in colors.

A facility equipment management apparatus according to a fourth embodiment differs from those of the first to third embodiments in that the hue value is designated on a color bar (hue scale), which is a color sample, on the color information setting screen. Except for this point, the fourth embodiment is the same as the first to third embodiments. For this reason, the fourth embodiment will be described with reference to FIGS. 1 to 5 also. In the fourth embodiment, the user who does not understand the meaning of technical terms such as the hue value and the hue difference value can easily make a setting on the color information setting screen.

Figure 14:
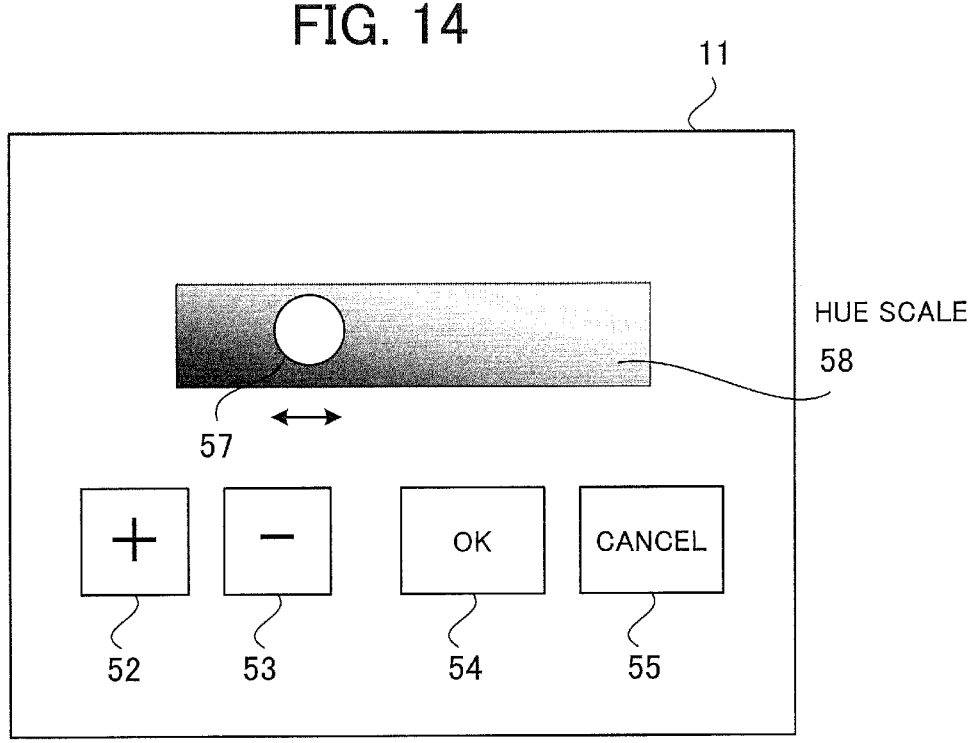
FIG. 14 is a schematic diagram showing a color information setting screen of an image display unit of a facility equipment management apparatus according to a fourth embodiment of the present invention.

FIG. 14 is a schematic diagram showing a color information setting screen of an image display unit 11 of the facility equipment management apparatus according to the fourth embodiment. The color information setting screen includes an indicator 57 that indicates the present color tone, a Left Move button 52, a Right Move button 53, an OK button 54, a Cancel button 55, and an indicator guide 58 that indicates a settable color tone in the form of the color bar (hue scale). As the color bar used as the indicator guide 58, a known hue scale in the HSV display color range can be used. The color bar can also be a hue ring.

The indicator 57 is presented to help the user understand the present color tone intuitively. The indicator 57 is displayed on the indicator guide 58 and displayed in a position corresponding to the present color tone.

The Left Move button 52, the Right Move button 53, the OK button 54, and the Cancel button 55 are the same as those in the first to third embodiments.

As described above, in the facility equipment management apparatus according to the fourth embodiment, the indicator guide 58 is a hue scale formed to change the color such as red, blue, and green continuously and the user can select a desired color intuitively. Specifically, the guide is displayed like a color bar. Accordingly, the user can easily set a tint that the user wants to set as the tint of the display screen even if the user does not understand technical terms.

(5) Fifth Embodiment

Described in the first to third embodiments above is the configuration that the user sets a desired color tone through the color information setting screen displayed on the image display unit 11 by means of the position of the indicator 41, the hue value, or the hue difference value. That is, in the first to third embodiments described above, the user who can change the color information through the color information setting screen is limited to a person who has some expertise in colors.

A facility equipment management apparatus according to a fifth embodiment differs from those in the first to fourth embodiments in that the user can determine through the information setting screen a tint the user wants to use while seeing a colored sample image of the screen that is actually displayed. Except for this point, the fifth embodiment is the same as the first to fourth embodiments. For this reason, the fifth embodiment will be described with reference to FIGS. 1 to 5 also. In the case of the fifth embodiment, it is also possible for the user who does not understand the meaning of technical terms such as the hue value and the hue difference value to make the setting easily through the color information setting screen.

Figure 15:
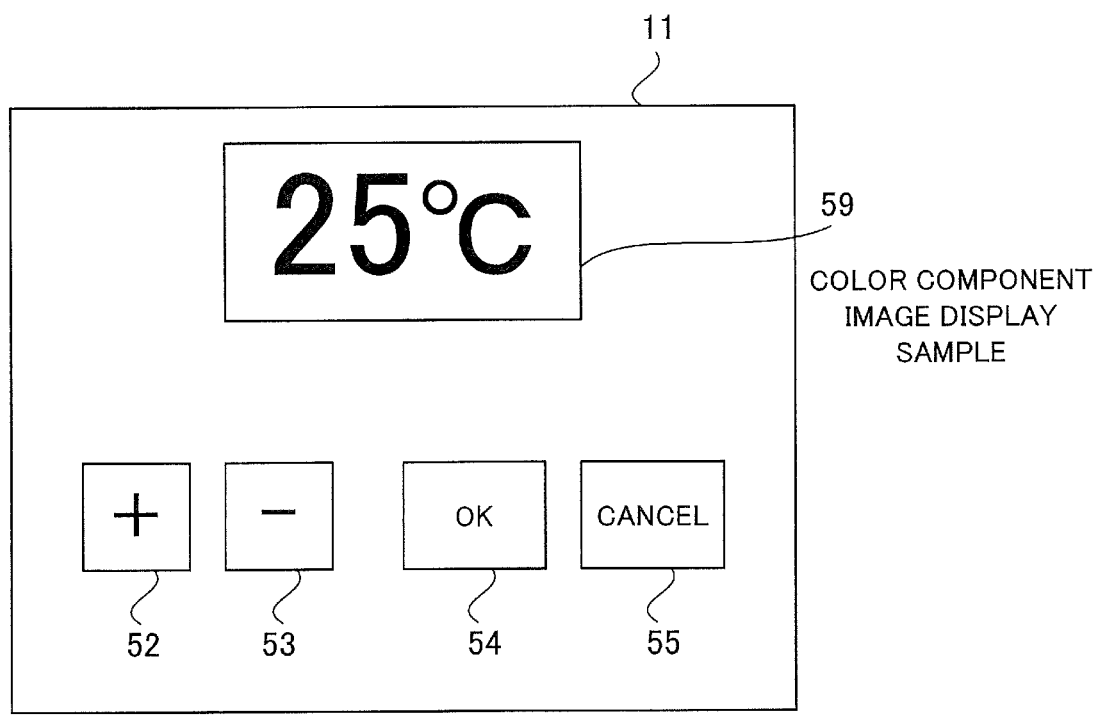
FIG. 15 is a schematic diagram showing a color information setting screen of an image display unit of a facility equipment management apparatus according to a fifth embodiment of the present invention.

FIG. 15 is a schematic diagram showing a color information setting screen of an image display unit 11 of the facility equipment management apparatus according to the fifth embodiment. The color information setting screen includes a sample image 59 showing a color tone of a present image, an Add button 52, a Subtract button 53, an OK button 54, and a Cancel button 55. The sample image 59 presents a sample of a tint of an image displayed in accordance with a present hue value to the user and helps the user understand the tint intuitively.

The Add button 52, the Subtract button 53, the OK button 54, and the Cancel button 55 are the same as those in the second to fourth embodiments.

As described above, the facility equipment management apparatus according to the fifth embodiment immediately reflects a tint according to the hue value in a sample image and presents such sample images successively to the user each time the Add button 52 or the Subtract button 53 is pressed, and the user can consequently set a desired tint while visually checking a final screen image. Therefore, the user can easily set a tint the user wants to set as the tint of the display screen even if the user does not understand technical terms.

INDUSTRIAL APPLICABILITY

An example of application of the present invention is a control device, which is a facility equipment management apparatus that manages and remote-controls as air conditioner. The present invention can also be applied when the facility equipment to be managed is any other facility equipment such as lighting equipment and a security system.

What is claimed is:

1. A facility equipment management apparatus that performs communication with a facility equipment and manages an operation of the facility equipment, the facility equipment management apparatus comprising:
a processor configured to execute a program; and
a memory which stores a color palette that includes a plurality of color numbers and a plurality of pieces of display color data corresponding to the plurality of color numbers respectively and the program which, when executed by the processor,
makes an image display unit display an image;
receives a user operation; and
changes the plurality of pieces of display color data of the color palette based on color information designated on the user operation, wherein
the memory stores component image data which indicates a display component which is configured by assigning an index value corresponding to a color number to each of a plurality of pixels configuring the component image data indicating the display component, the color number being one of the plurality of color numbers,
the processor performs processes of constructing color component image data, which is the component image data including the color number by replacing the index value of each of the plurality of pixels configuring the component image data with the color number corresponding to the index value, and makes the image display unit display the image by using the color component image data,
the color information designated on the user operation is information corresponding to a hue value,
the processor performs a process of making the image display unit display a color information setting screen, and
the color information setting screen includes:
a sample image display area in which a color component sample image based on a changed value of the hue value is displayed; and
an operation means that increases or decreases the hue value.

2. The facility equipment management apparatus of claim 1, wherein the color component sample image is a sample image of a set temperature.

* * * * *